United States Patent [19]
McDonald

[11] Patent Number: 4,562,479
[45] Date of Patent: Dec. 31, 1985

[54] AUTOMATIC KINESCOPE BEAM CURRENT LIMITER

[75] Inventor: James A. McDonald, Carmel, Ind.

[73] Assignee: RCA Corporation, Princeton, N.J.

[21] Appl. No.: 603,936

[22] Filed: Apr. 26, 1984

[51] Int. Cl.[4] .......................... H04N 5/68; H04N 9/16
[52] U.S. Cl. ........................................ 358/243; 358/74
[58] Field of Search .................... 358/64, 74, 243, 168, 358/169

[56] References Cited
U.S. PATENT DOCUMENTS

| | | | |
|---|---|---|---|
| 3,842,201 | 10/1974 | Ghaem-Maghami et al. | 358/243 |
| 3,914,545 | 10/1975 | Engel | 358/243 |
| 3,980,822 | 9/1976 | Suzuki et al. | 358/243 |
| 4,017,681 | 4/1977 | Smeulers et al. | 358/243 |
| 4,167,025 | 9/1979 | Willis | 358/243 |

Primary Examiner—James J. Groody
Assistant Examiner—Randall S. Svihla
Attorney, Agent, or Firm—P. J. Rasmussen; P. M. Emanuel; R. H. Kurdyla

[57] ABSTRACT

In a television receiver, an automatic kinescope beam current limiter circuit includes a current path between a beam current sense point and an interating capacitor across which a control voltage is developed. A threshold conduction device causes the current path to exhibit different impedance characteristics and associated response times so that the limiter circuit has the ability to respond to average beam current values, as well as to above average r.m.s. beam current values such as may be associated with peak beam current conditions.

11 Claims, 1 Drawing Figure

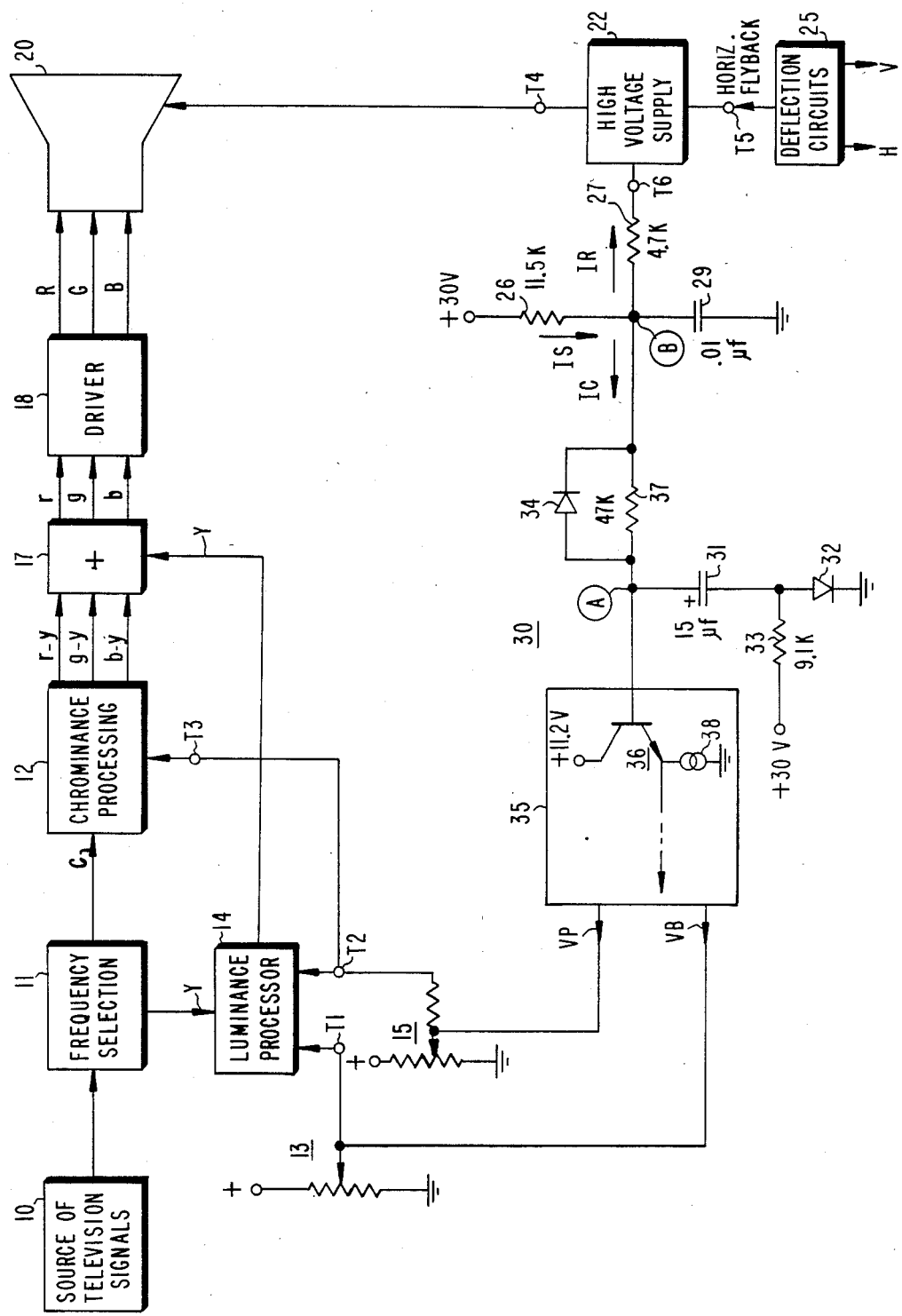

AUTOMATIC KINESCOPE BEAM CURRENT LIMITER

This invention concerns apparatus for automatically limiting excessive average and above average beam currents conducted by an image display device such as a kinescope in a television receiver or equivalent video signal processing and display system.

Excessive beam currents conducted by an image reproducing kinescope in a television receiver can result in a degraded image display. Specifically, excess beam currents can degrade the performance of the receiver deflection system which is operatively associated with the kinescope, and can cause electron beam spot defocussing and picture blooming. High beam currents can also exceed the safe operating current capability of the kinescope, possibly damaging the kinescope and associated circuit components which may be sensitive to high beam current levels.

Various arrangements for automatically controlling both excessive average beam currents and excessive peak or transient beam currents are known, one of which is described in U.S. Pat. No. 4,167,025 of D. H. Willis. The Willis arrangement is particularly advantageous in that it can respond rapidly to very fast peak beam current transients such as may be encountered when switching from one channel of the receiver to another. It is herein recognized that a peak responding beam current limiter of the type described in the aforementioned Willis patent may be unable to respond satisfactorily to certain peak beam currents of greater-than-average magnitude. An excessively high above-average beam current level is often associated with a repetitive scene which includes a relatively large bright area surrounded by darker areas, such as may be encountered in graphics and video games displays, for example. Such scene is repetitive at the vertical field scanning rate, and produces a repetitive peak beam current characteristic with significant above-average content. A high above-average beam current level is undesirable since it can lead to excessive heating in the deflection circuits of the receiver, possibly resulting in thermal destruction of one or more components of the deflection circuits. High above-average beam current levels can also cause excessive local heating of the kinescope mask, causing the mask to warp and resulting in colorimetry errors.

In accordance with the principles of the present invention, there is disclosed herein a video signal processing system with kinescope beam current limiter apparatus which acts to limit both excessive average beam current levels and excessive above-average beam current levels. The disclosed apparatus includes an average responding integrating capacitor across which is developed a beam current limiting control voltage for application to a video signal control point in a video channel. A current path connects the integrating capacitor to a sense point at which a signal representative of the magnitude of kinescope beam current is developed. The current path includes a threshold circuit which modifies the response time of the circuit including the capacitor, to permit a faster rate of change of the voltage across the capacitor in the presence of high beam current levels including those with a high above-average level.

The single FIGURE of the drawing shows a portion of a color television receiver, partly in block form and partly in schematic circuit form, including apparatus in accordance with the principles of the present invention.

A composite color television signal from a source 10 is applied to a frequency selection network 11 which provides separated luminance (Y) and chrominance (C) components of the television signal at respective outputs. A chrominance processor 12 derives plural color difference signals r-y, g-y and b-y from the separated chrominance component. The separated luminance component is processed by a luminance processor 14 which includes DC level shifting, amplifying and gain control circuits, for example. The wiper of a manual, viewer adjustable brightness control potentiometer 13 is coupled via a terminal $T_1$ to a luminance signal DC level control input of processor 14. The DC level of the luminance signal and, thereby, the brightness of a displayed image vary in accordance with the level of the voltage applied to terminal $T_1$. The wiper of a manual, viewer adjustable picture control 15 is coupled via a terminal $T_2$ to a luminance signal gain control input of processor 14, and via a terminal $T_3$ to a chrominance signal gain control input of chrominance processor 12. The gains of the luminance and chrominance signals and thereby the contrast of a displayed image vary in accordance with the level of the voltage applied to terminals $T_2$ and $T_3$.

Processed luminance signals from processor 14 are combined with the color difference signals from processor 12 in a matrix amplifier 17 for producing low level color image representative signals r, g and b. These signals are applied to respective kinescope driver amplifiers in a driver stage 18 for producing high level video output signals R, G, B suitable for driving the intensity control electrodes, e.g., cathode electrodes, of a color image displaying kinescope 20.

A high operating voltage for the ultor (anode) electrode of kinescope 20 is provided from an output terminal $T_4$ of a high voltage supply network 22 including a high voltage multiplier. Horizontal flyback pulses from receiver deflection circuits 25 are applied to network 22 via a terminal $T_5$, and a kinescope resupply current (IR) from a current source comprising a resistor 26 and an associated DC voltage supply (+30 V) is provided to network 22 via a resistor 27 and a terminal $T_6$. Deflection circuits 25 provide horizontal (H) and vertical (V) deflection control signals for use by the receiver as is known.

Operatively associated with the kinescope resupply current source is an automatic kinescope beam current limiter network 30 comprising an integrating capacitor 31, a switching diode 32, a bias resistor 33, a beam current limiter control signal sequencing network 35, and a network including a diode 34 and a resistor 37 in accordance with the principles of the present invention. The beam current limiter responds to the magnitude of resupply current IR, which is representative of the magnitude of the beam current conducted by the kinescope, for automatically limiting excessive average, transient peak and above-average kinescope beam currents.

Integrating capacitor 31 is coupled between a node A and ground via diode 32, which is normally maintained in a conductive state by means of bias provided via resistor 33. The voltage developed at node A varies in accordance with the level of the kinescope beam current, as manifested by the magnitude of resupply current IR.

A source current IS conducted by resistor 26 of the kinescope resupply system includes a control current component IC which flows to circuit 30 in a DC coupled current path between node A and a sensing node B, and resupply current component IR which flows to an input of high voltage supply 22. The magnitudes of currents IR and IC are inversely related such that current IC decreases as current IR increases, for example. A filter capacitor 29 removes horizontal line rate resupply current components at node B. The magnitude of resupply current IR varies in accordance with the beam current conducted by the kinescope.

In the normal, non-beam limiting mode, the voltage developed at node A is sufficiently large to forward bias the base-collector junction of an input emitter follower transistor 36 in network 35, whereby control current IC flows through resistor 37 and from the base to the collector of transistor 36. The forward biased base-collector junction of transistor 36 acts as a voltage clamp with respect to node A. At this time diode 34 exhibits a reverse biased, non-conductive state. The collector current of transistor 36 corresponds to control current IC, and the emitter current of transistor 36 is supplied by a current source 38. No beam limiting control action is produced as long as the base-collector junction of transistor 36 is forward biased, during which time node A is clamped to a voltage approximately 0.7 volts greater than the collector bias voltage (+11.2 volts) of transistor 36. Also at this time, transistor 36 operates non-linearly with respect to variations of control current IC, whereby the emitter current and voltage of transistor 36 remain substantially unchanged as a function of base current.

Automatic beam current limiting action begins when resupply current IR increases to a point where control current IC diminishes to a level on the order of several microamperes. When this occurs, the base-collector junction of transistor 36 becomes reverse biased, whereby node A is unclamped and exhibits a voltage which decreases with increasing resupply current IR. Transistor 36 then operates linearly to produce an emmiter control voltage which varies as a function of variations of resupply current IR and the corresponding voltage at node A.

The emitter control voltage of transistor 36 is utilized to develop variable beam limiting control voltages VP and VB at the output of network 35. Specifically, variable control voltage VP is developed when excessive beam currents occur throughout a first range, in which case voltage VP serves to limit such excessive beam currents by reducing the amplitudes of the luminance and chrominance signals via gain control inputs T$_2$ and T$_3$ of luminance processor 14 and chrominance processor 12. Control voltage VB is developed in response to excessive beam currents throughout a second range having a magnitude greater than the magnitude of beam currents within the first range. In such case the picture gain control beam current limiting action is supplemented by reducing the DC level of the video signal (i.e., reducing image brightness) via control voltage VB and terminal T$_1$ of luminance processor 14. A sequentially operating beam current limiter of this type is described in U.S. Pat. No. 4,253,110 of L. A. Harwood et al., and is also discussed in a copending J. S. Fuhrer U.S. patent application Ser. No. 391,415 filed June 23, 1982, now U.S. Pat. No. 4,451,849, and titled "Plural Operating Mode Ambient Light Responsive Television Picture Control."

In the presence of excessive transient peak kinescope beam current conditions a transient, negative-going voltage is developed at node B and at node A, and is coupled through capacitor 31 to diode 32, rendering diode 32 non-conductive and thereby decoupling capacitor 31. Changes in peak beam resupply currents are then sensed directly (i.e., without filtering) by network 35 and are controlled via the control voltage outputs from network 35 in the manner previously discussed. When capacitor 31 is decoupled, the voltage at node A varies freely with rapid changes in excessive transient resupply currents. Such peak beam current limiting operation of network 30 is described in greater detail in U.S. Pat. No. 4,167,025—Willis.

The circuit including diode 34 and resistor 37 advantageously gives beam limiter control network 30 the capability of limiting the above-average value of excessive beam currents, as well as limiting the average value thereof. Specifically, circuit 34, 37 permits network 30 to respond to repetitive (e.g., field rate) peak beam currents which exhibit a somewhat sinusoidal amplitude characteristic with an above-average value.

Diode 34 is non-conductive (reverse biased) in the non-beam limiting mode. As mentioned previously, beam current limiting action begins when resupply current IR increases to a point where control current IC diminishes to a level on the order of several microamperes, whereby transistor 36 no longer conducts in a saturated state and node A is unclamped. Diode 34 is non-conductive at the onset of the beam limiting mode, and remains non-conductive over an initial range of decreasing control current IC in the beam limiting mode.

While diode 34 remains non-conductive in the beam limiting mode, decreasing control current IC discharges integrating capacitor 31 via resistor 37, whereby the declining, less positive voltage across capacitor 31 is related to the magnitude of average kinescope beam current conduction. For average detection, circuit 30 exhibits a response time related to the value of capacitor 31 and the impedance of the current path comprising resistor 37 between nodes A and B.

A further decline in the level of control current IC due to higher beam current levels causes diode 34 to become forward biased into conduction. Diode 34 begins to conduct significant forward current, in effect short-circuiting resistor 37, when the forward biasing voltage across diode 34 is approximately +0.5 volts. When diode 34 conducts, capacitor 31 is discharged much more rapidly through diode 34 rather than through resistor 37, with a much faster time constant due to the reduced impedance in the current path from node A to node B. The action of diode 34 with capacitor 31 resembles that of a conventional peak detector, although with somewhat less efficiency.

Diode 34 can be rendered conductive in response to high level, excessive average beam currents, in which case the response time of circuit 30 to high level excessive average beam currents is decreased. More significantly, the relatively rapid discharging of capacitor 31 afforded by conductive diode 34 enables beam current control circuit 30 to provide significant limiting of the above-average value of excessive beam currents, particularly with respect to such beam currents when associated with a repetitive scene having significant peak white content. The above-average value of beam current normally would not be sensed by an average responding circuit, ie., capacitor 31 and resistor 37 when diode 34 is non-conductive. The above-average value of beam current is potentially damaging especially when associated with a repetitive bright image area. In such case the deflection circuits and kinescope can be subjected to the potentially damaging effects of stress factors such as excessive heating in the deflection circuits and localized heating in the kinescope, for example. The action of diode 34 advantageously serves to significantly limit the above-average beam current value, thereby enhancing the overall reliable operation of the receiver.

Resistor 37 also serves to recharge capacitor 31 during non-beam current limiting intervals, and provides base bias for transistor 36.

What is claimed is:

1. In a video signal processing system including a video signal channel, and a current-conducting image display device responsive to video signals received from said video channel; control apparatus comprising:
   a source of signal representative of the magnitude of current conducted by said display device in response to said video signals, said representative signal being provided at a sense point;
   filter means;
   means for coupling a control voltage developed by said filter means to a control input of said video channel; and
   a current path including threshold conduction means for coupling said representative signal from said sense point to said filter means for causing said filter means to develop said control voltage related to the magnitude of said representative signal; said threshold conduction means exhibiting first and second conductive states as a function of the magnitude of said representative signal;
   wherein said threshold means when exhibiting said first conductive state causes said control apparatus to exhibit a first response time related to a first value of the impedance of said current path; and when exhibiting a second conductive state causes said control apparatus to exhibit a relatively faster second response time related to a modified, second value of impedance of said current path.

2. Apparatus according to claim 1, wherein
said filter means comprises an integrating capacitor; and
said first and second response times are related to the value of said capacitor and respectively to said first and second values of said impedance of said current path.

3. Apparatus according to claim 2, wherein
said current path includes a resistance coupled between said capacitor and said sense point;
said first response time is related to the value of said capacitor and the value of said resistance when said threshold means exhibits said first conductive state; and
said second response time is related to the value of said capacitor and a diminished value of resistance of said current path produced when said threshold means exhibits said second conductive state.

4. Apparatus according to claim 3, wherein
said current path is DC coupled between said sense point and said capacitor.

5. Apparatus according to claim 3, wherein
said capacitor develops a voltage thereacross representative of the average value of said representative signal in accordance with said first response time.

6. Apparatus according to claim 5, wherein
said resistance is coupled in series between said sense point and said capacitor;
said threshold means comprises a unilateral current conducting device coupled across said resistance; and
said unilateral current conducting device exhibits a first, non-conductive state and a second, conductive state.

7. Apparatus according to claim 5, wherein
a current source provides a resupply current for said image display device; and
the magnitude of said representative signal is related to the magnitude of said resupply current.

8. In a video signal processing system including a video signal channel; a current-conducting image display device responsive to video signals received from said channel; and a source of resupply current for said image display device; apparatus comprising:
   means for providing a signal representative of the magnitude of said resupply current at a sense point;
   a filter capacitor coupled between a control point and a reference potential;
   means for coupling a control voltage developed by said capacitor at said control point to a control input of said video channel, for limiting the magnitude of current conducted by said display device in accordance with said control voltage;
   a current path including a resistor for coupling signals from said sense point to said capacitor, said capacitor developing said control voltage related to the magnitude of said representative signal; and
   threshold conduction means coupled across said resistor and exhibiting first and second conductive states in response to the magnitude of said representative signal.

9. Apparatus according to claim 8, wherein
said current path DC couples said representative signal to said capacitor.

10. Apparatus according to claim 8, wherein
said apparatus exhibits a first response time when said threshold means exhibits a first, non-conductive state, said first response time being related to the values of said capacitor and said resistor; and
said apparatus exhibits a second, relatively faster response time when said threshold means exhibits a second, conductive state.

11. Apparatus according to claim 10, wherein
said capacitor developes a voltage representative of the average value of said representative signal in accordance with said first response time.

* * * * *